United States Patent
Korosi-Szabo et al.

(10) Patent No.: US 11,087,171 B2
(45) Date of Patent: Aug. 10, 2021

(54) SYSTEM FOR ASSESSING AN IMAGE, OPERATING ASSISTANCE METHOD, CONTROL UNIT FOR A WORKING DEVICE, AND WORKING DEVICE

(71) Applicant: Robert Bosch GmbH, Stuttgart (DE)

(72) Inventors: Peter Korosi-Szabo, Budapest (HU); Attila Borcs, Budapest (HU); Kornel Istvan Kis, Tapolca (HU); Levente Kis, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 115 days.

(21) Appl. No.: 16/542,694

(22) Filed: Aug. 16, 2019

(65) Prior Publication Data

US 2020/0065622 A1 Feb. 27, 2020

(30) Foreign Application Priority Data

Aug. 22, 2018 (DE) .......................... 102018214198.3

(51) Int. Cl.
| | |
|---|---|
| *G06K 9/62* | (2006.01) |
| *G06K 9/66* | (2006.01) |
| *G06T 7/00* | (2017.01) |
| *G06N 3/08* | (2006.01) |

(52) U.S. Cl.
CPC .............. *G06K 9/6256* (2013.01); *G06K 9/66* (2013.01); *G06N 3/08* (2013.01); *G06T 7/001* (2013.01)

(58) Field of Classification Search
CPC ............................... G06K 9/6256; G06K 9/66
See application file for complete search history.

(56) References Cited

U.S. PATENT DOCUMENTS

| | | | |
|---|---|---|---|
| 2018/0293707 A1* | 10/2018 | El-Khamy | ............ G06T 3/4069 |
| 2018/0293711 A1* | 10/2018 | Vogels | .................. G06T 15/005 |

\* cited by examiner

*Primary Examiner* — Tuan H Nguyen
(74) *Attorney, Agent, or Firm* — Norton Rose Fulbright US LLP; Gerard Messina (57) ABSTRACT

A system for assessing and/or adapting an image recorded with a camera, based on a deep neural network. The deep neural network undergoes a training, the training of the deep neural network is carried out based on a loss function as a metric, the loss function is based on a structural similarity index, and the structural similarity index in the training is ascertained based on at least one input image of the underlying camera, an output image of the deep neural network, and in particular an adaptation method via the deep neural network and a target image as default.

11 Claims, 4 Drawing Sheets

SYSTEM FOR ASSESSING AN IMAGE, OPERATING ASSISTANCE METHOD, CONTROL UNIT FOR A WORKING DEVICE, AND WORKING DEVICE

RELATED APPLICATION INFORMATION

The present application claims priority to and the benefit of German patent application no. 10 2018 214 198.3, which was filed in Germany on Aug. 22, 2018, the disclosure of which is incorporated herein by reference.

FIELD OF THE INVENTION

The present invention relates to a system for assessing and/or for adapting an image recorded with a camera, in particular in an operating assistance system of a working device or a vehicle, an operating method, and a control unit for a working device and in particular for a vehicle, and a working device, in particular a vehicle as such.

BACKGROUND INFORMATION

Operating assistance systems and in particular driving assistance systems for working devices and in particular for vehicles are becoming increasingly popular. With regard to aspects of autonomous operation and autonomous driving, measures for surroundings detection and surroundings assessment are of vital importance to allow necessary control operations to be planned and carried out. The quality of images detected from the surroundings of the working device is of major importance. Image processing measures may be used to increase the quality of detected primary images, so that secondary images processed in the surroundings assessment are supplied to decision processes. However, changes in the exposure conditions, and in particular rapid changes in luminance and contrast in a scene, may be problematic for automated vision and recognition in the image assessment.

SUMMARY OF THE INVENTION

The system according to the present invention having the features of claim 1 has the advantage over the related art that even rapid changes in luminance and/or contrast of a scene may be better taken into account. According to the present invention, this is achieved with the features of claim 1 by providing a system for assessing and/or adapting an image recorded with a camera, in particular in an operating assistance system of a working device or a vehicle, in which a deep neural network is used, the deep neural network undergoes training, the training of the deep neural network is carried out based on a loss function as a metric, the loss function is based on a structural similarity index, and the structural similarity index in the training is ascertained based on at least one input image of the underlying camera, an output image of the deep neural network, and in particular an adaptation method via the deep neural network and a target image as default. Via the training operation according to the present invention, the behavior of the underlying deep neural network may be adapted particularly well with regard to improved behavior under rapidly changing light conditions, so that in the application, primary images may be suitably processed and in particular evaluated in the image processing with regard to the light conditions in order to be utilized for a high-quality surroundings assessment.

The system according to the present invention may be understood and implemented strictly as hardware, for example as a device for assessing and/or adapting images. For example, an implementation as an ASIC is conceivable. Alternatively, an implementation strictly in terms of a process, for example in conjunction with a computer implementation of the system according to the present invention, is conceivable, which may be in conjunction with or as methods for machine vision, also referred to as computer vision methods. Combined or mixed systems are also conceivable in which partial aspects of the present invention are implemented as hardware and/or software or in terms of a process.

It is particularly advantageous when, in one advantageous specific embodiment of the system according to the present invention, in the training a particular input image and a particular target image depict the same scene or essentially the same scene with different exposure conditions, in particular with regard to luminance and/or contrast. In this way the behavior under different light conditions may be trained in a particularly suitable manner.

Alternatively or additionally, it may be provided that the scene depicted in the input image is at most represented more poorly or is at most illuminated with a lower illumination intensity and/or with less contrast than the scene in the target image.

The target image may be provided by the same camera as the input image.

The training results in a particularly high degree of flexibility when a particular target image is provided at a different point in time than the input image.

In addition, a high degree of adaptation results for the underlying deep neural network when, according to another exemplary embodiment of the present invention, in the training a plurality of input images is based on one or multiple target images or multiple scenes.

Index of structural similarity SSIM' may be used in conjunction with a loss function $SSIM_{loss}$, in particular according to the following equation (I):

$$SSIM_{loss}(i,o,t) = 1 - SSIM'(i,o,t), \qquad (I)$$

and in particular as a function of an input image i, an output image o, and a target image t, and/or as a metric of the training or for training the underlying deep neural network.

Alternatively or additionally, it is conceivable to use structural similarity index SSIM' in a product representation, in particular according to the following equation (II):

$$SSIM(i,o,t) = l(o,t)^\alpha \cdot c(o,t)^\beta \cdot s(i,o)^\gamma, \qquad (II)$$

Furthermore, it is alternatively or additionally conceivable to use the structural similarity index in conjunction with a first component or factor 1 that describes the luminance and/or illumination intensity between an output image o and a target image t, a second component or factor c that describes the contrast between output image o and target image t, and/or a third component or factor s that describes the structural component between an input image i and output image o.

Each of the components or factors may be weighted with the aid of a hyperparameter α, β, γ that functions as an exponent of the particular factor.

A factor of the form according to equation (2)

$$l(x, y) = \frac{2\mu_x\mu_y + C_1}{\mu_x^2 + \mu_y^2 + C_1} \qquad (2)$$

may be used as first factor l.

A factor of the form according to equation (3)

$$c(x, y) = \frac{2\sigma_x \sigma_y + C_2}{\sigma_x^2 + \sigma_y^2 + C_2} \quad (3)$$

may be used as second factor c.

A factor of the form according to equation (4)

$$s(x, y) = \frac{2\sigma_{xy} + C_3}{\sigma_x \sigma_y + C_3} \quad (4)$$

may be used as third factor s.

In this regard, the symbols listed below may have the following meanings:

- $\mu_x$: an average value of an image or partial image x,
- $\mu_y$: an average value of an image or partial image y,
- $\sigma_x^2$: the variance of the image or partial image x,
- $\sigma_y^2$: the variance of the image or partial image y,
- $\sigma_{xy}^2$: the covariance of the images or partial images x and y,
- $c_1$: a first variable that is predetermined or is to be predetermined for stabilizing the division for small denominators, in particular where $c_1 = (k_1 L)^2$,
- $c_2$: a second variable that is predetermined or is to be predetermined for stabilizing the division for small denominators, in particular where $c_2 = (k_2 L)^2$,
- $c_3$: a third variable that is predetermined or is to be predetermined for stabilizing the division for small denominators, in particular where $c_3 = c_2 / 2$,
- L: a dynamic range of the pixel values, in particular having a value $2^{number\ of\ bits\ per\ pixel} - 1$,
- $k_1$: a first parameter that is predetermined or is to be predetermined as a function of the application, for example having a value of 0.01, and/or
- $k_2$: a second parameter that is predetermined or is to be predetermined as a function of the application, for example having a value of 0.03.

These parameters may also be defined and selected, for example, the same as conventional SSIM.

According to another exemplary embodiment of the system according to the present invention, during the training the first component or factor and the second component or factor between an output image and a setpoint or target image of the deep neural network are determined as the first and second images, and/or the third component or factor between an associated input image and the output image of the deep neural network is determined as the first and second images.

Additionally or alternatively, during the training of the underlying deep neural network, an operation of optimizing may be based on index SSIM' and/or on loss function $SSIM_{loss}$.

A further subject matter of the present invention relates to an operating assistance method for a working device and in particular for a vehicle, which in this case may also be referred to as a driving assistance method. The core concept of the operating assistance method is the provision and use of a system configured according to the present invention.

Moreover, the present invention provides a control unit for a working device and in particular for a vehicle.

The control unit is configured to initiate and/or carry out an operating assistance method according to the present invention, to be used with an operating assistance method according to the present invention, and/or to be used with a system configured according to the present invention.

A working device is also provided by the present invention. This may be a vehicle, in particular a motor vehicle, which is configured for autonomous or semiautonomous driving. Application in the field of robotics and the like is also conceivable.

The vehicle is configured to be controlled or used by or with an operating assistance method according to the present invention, to include a control unit configured according to the present invention and/or a system constructed according to the present invention, or to use such a control unit or such a system.

Specific embodiments of the present invention are described in greater detail with reference to the appended figures.

DETAILED DESCRIPTION

Exemplary embodiments of the present invention and the technical background are described in greater detail below with reference to FIGS. 1 through 4. Identical, equivalent elements and components as well as elements and components having an identical or equivalent function are denoted by the same reference numerals. A detailed description of the denoted elements and components is not provided in each case of their occurrence.

The described features and other properties may be arbitrarily separated from one another and arbitrarily combined with one another without departing from the core of the present invention.

Figure 1:
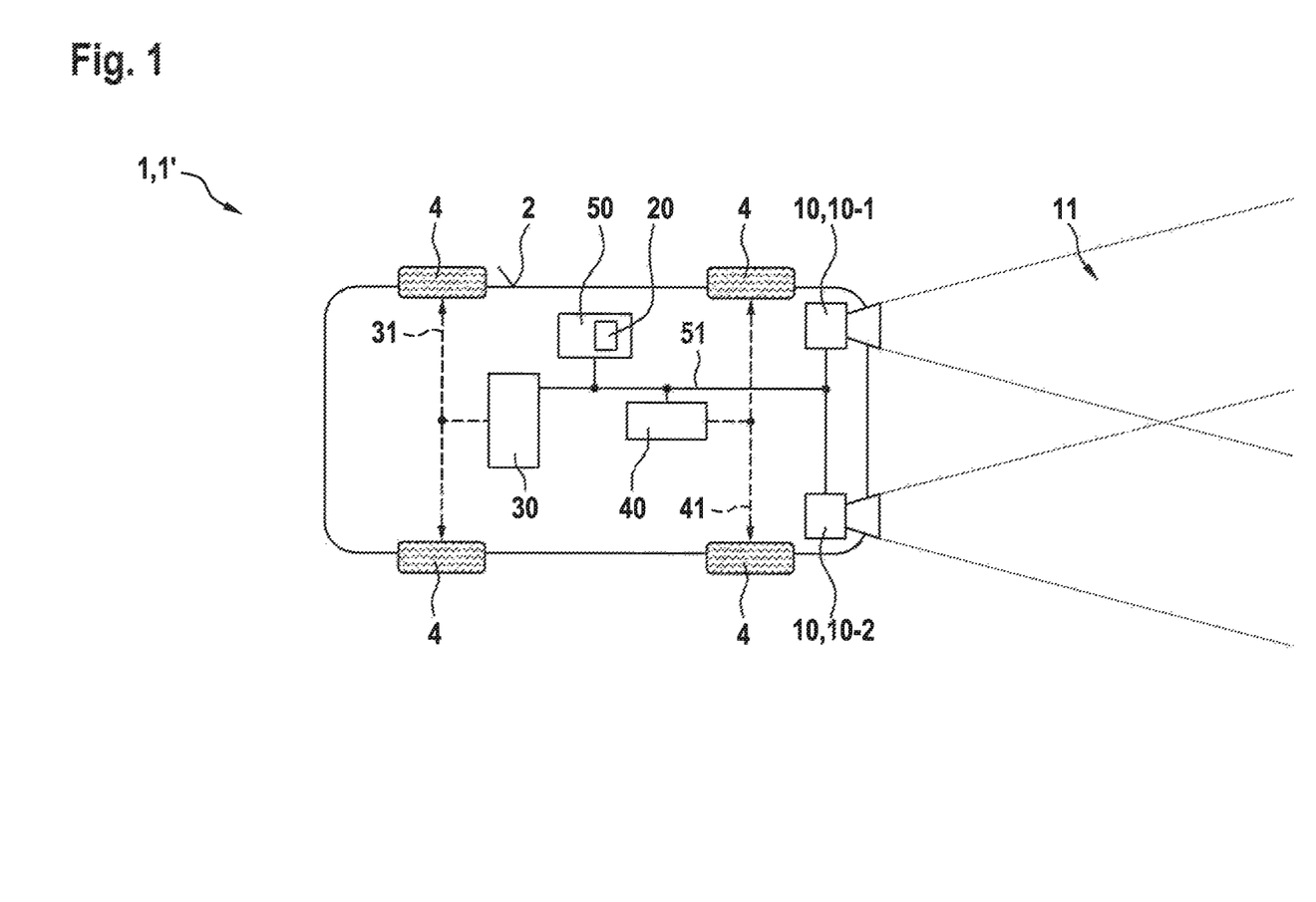
FIG. 1 shows a schematic block diagram of a working device configured according to the present invention in the form of a vehicle, which uses one specific embodiment of the system according to the present invention.

FIG. 1 shows a schematic block diagram of a working device 1 configured according to the present invention in the form of a vehicle 1', which uses one specific embodiment of system 100 or method S according to the present invention.

Vehicle 1' according to the present invention is schematically illustrated including a body 2, wheels 4, a drive 30 including a drive train 31, and a system 40 for steering and braking via a steering train and/or braking train 41.

Also provided is a control unit 50, for example in the form of a vehicle control or engine control system, which via a control and/or detection line 51 establishes a connection with drive 30 and system 40 for braking and steering.

In addition, via control and/or detection line 51, control unit 50 is also provided with cameras 10, namely, a first camera 10-1 and a second camera 10-2, for detecting the surroundings of vehicle 1'.

During operation of vehicle 1', images from the surroundings of vehicle 1' are supplied to control unit 50 via cameras 10, and are supplied to image processing and image assessment, using a deep neural network 20. According to the present invention, underlying deep neural network 20 is configured as part of control unit 50, and thus as part of system 100 for assessing and/or processing an image, and is thus based on a training method S1 carried out according to the present invention, which is described below and is part of overall method S for assessing and/or processing an image.

Figure 2:
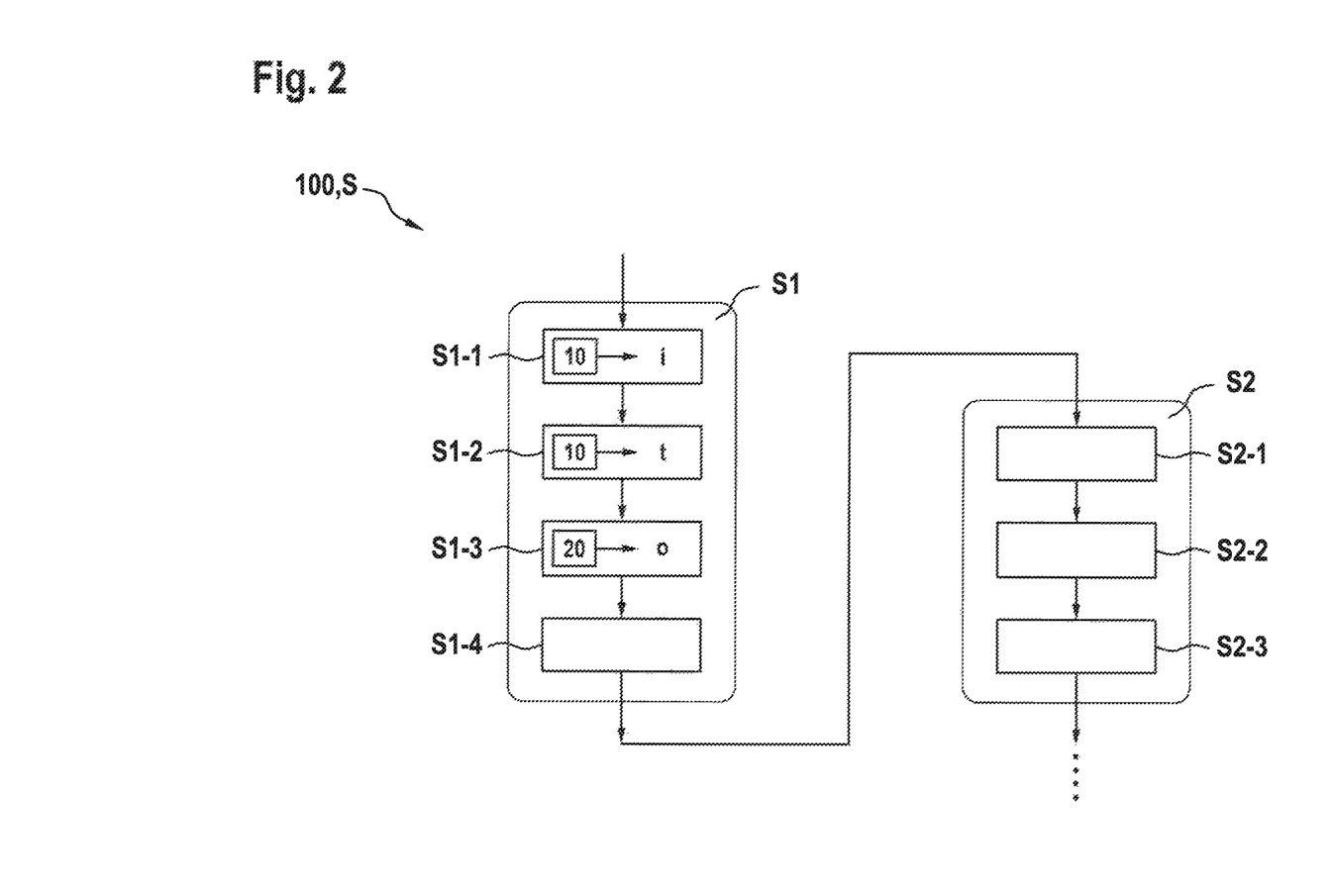
FIG. 2 shows a flow chart of one specific embodiment of a system according to the present invention, configured as a method, for assessing an image.

FIG. 2 shows a flow chart of one specific embodiment of a system 100 according to the present invention, configured as method S, for assessing and/or processing an image.

Method S according to the present invention is divided into a training phase or a training module S1, also referred to as training for short, and an application phase or an application module S2, also referred to as application for short.

An input image i is provided via camera 10 in a step S1-1 of training S1. In addition, a target image t is provided here, likewise with the aid of camera 10, via another step S1-2, target image t showing the same or essentially the same scene in visual field 11 of cameras 10 as input image i, but with different exposure properties or illumination properties, in particular with regard to the aspects of luminance and/or contrast.

Based on the operating principle of underlying deep neural network 20, an output image o is then generated based on a certain parameterization. This output image may be assessed and compared with regard to input image i and with regard to target image t in a subsequent step S1-4 in order to effectuate a learning adaptation of the parameterization of underlying deep neural network 20 in conjunction with an optionally iterated training S1.

Actual training S1 may be followed by an application phase S2. Actual application S2 encompasses detection S2-1 of images and assessment S2-2 of the detected images. Based on a result of image assessment S2-2, a control S2-3 of underlying working device 1 and its units may then take place.

It is thus conceivable, for example, based on image assessment S2-2, to control or regulate drive 30 as well as steering and braking 40 of a vehicle 1' in conjunction with semiautonomous or fully automated driving.

Figure 3:
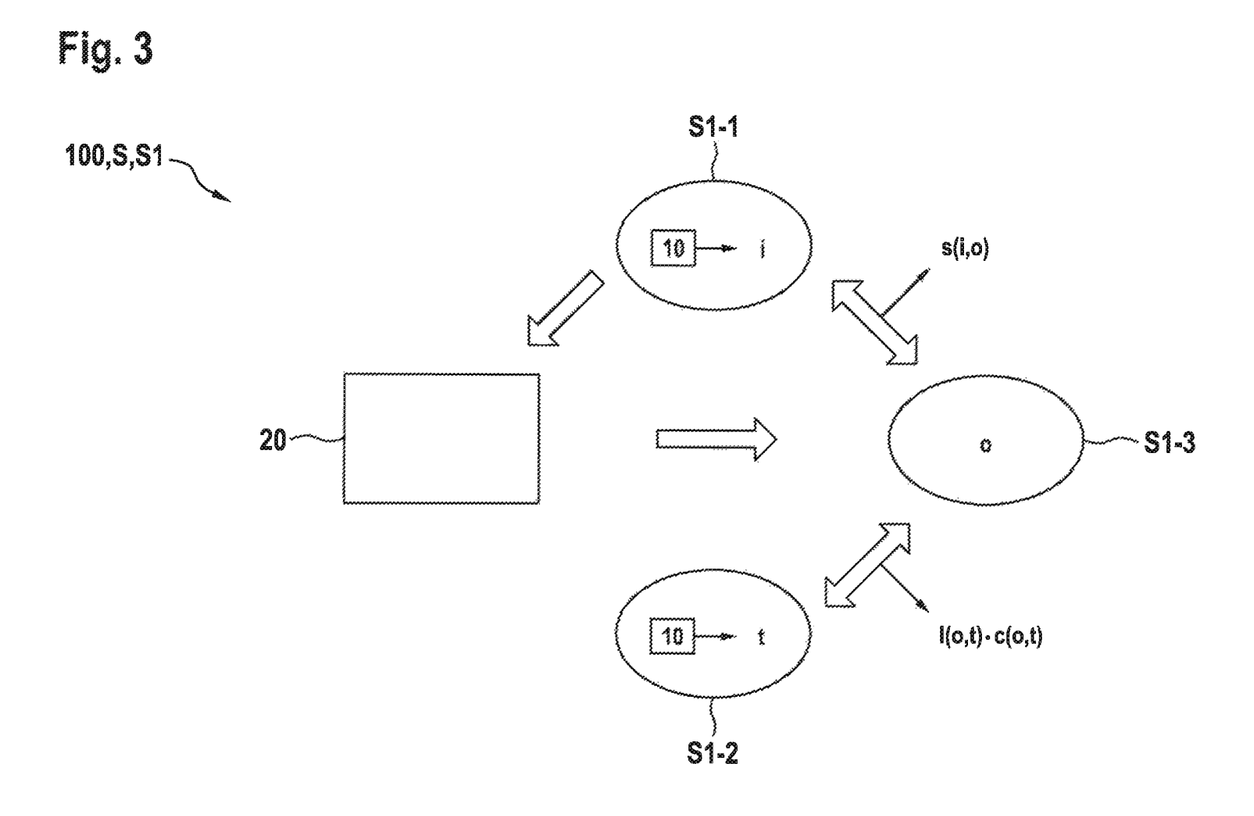
FIG. 3 shows a block diagram of another embodiment of the system according to the present invention for assessing an image.

FIG. 3 shows a block diagram of another embodiment of system 100 according to the present invention for assessing an image.

Once again, in conjunction with training S1 of underlying method S or system 100 according to the present invention, one or multiple input images i are provided in a first operation S1-1, and one or multiple target images t are provided in a second operation S1-2, by one or multiple cameras 10, and in conjunction with generation S1-3 of output images o are assessed by underlying deep neural network 20 for a corresponding learning process.

Figure 4:
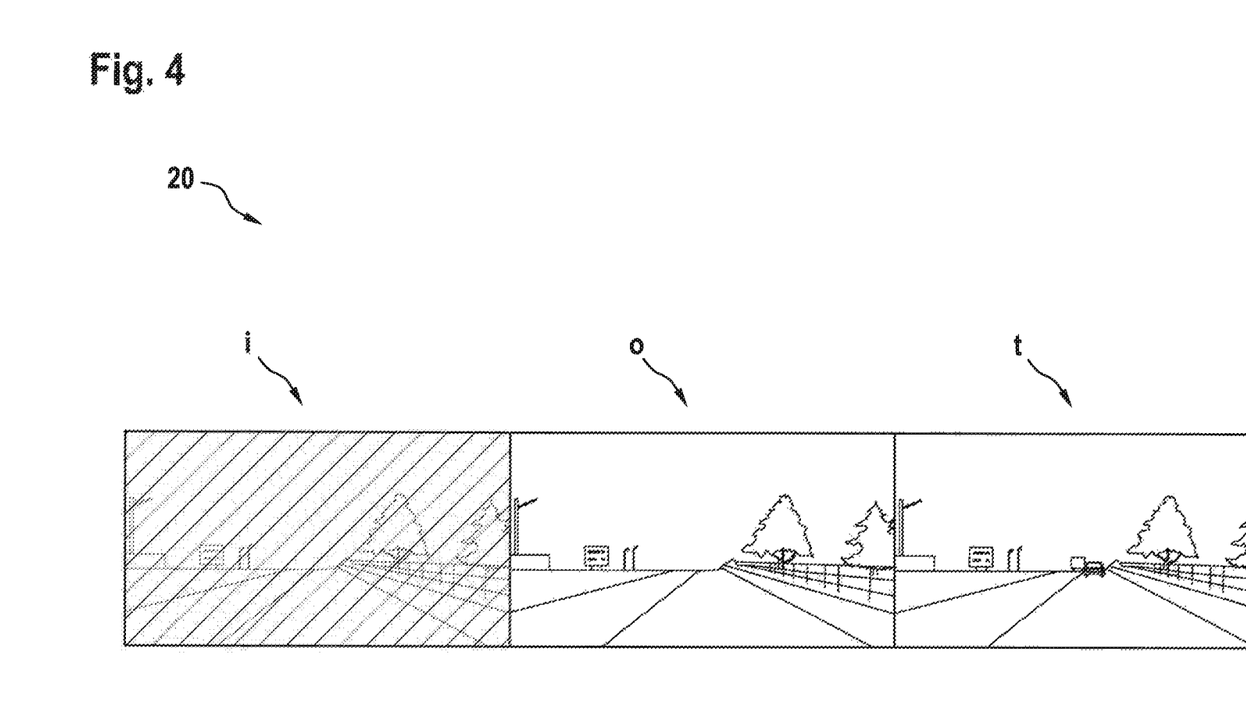
FIG. 4 shows a comparison of an input image, a target image, and an output image processed using one specific embodiment of the system or method according to the present invention.

FIG. 4 shows a comparison of an input image i, a target image t, and an output image o that is processed via one specific embodiment of system 100 or method S according to the present invention.

It is apparent that, in conjunction with training operation S1, underlying neural network 20 is enabled to process supplied input image i, based on the exposure or illumination conditions manifested in target image t, in such a way that output image o contains essentially the same structural components as input image i, but from learning operation S1 contains the corresponding illumination conditions or exposure conditions, in particular with regard to luminance and contrast.

These and further features and properties of the present invention are explained in greater detail below:

Determining the structural similarity index, also referred to as SSIM, is a well-known method for measuring image quality. It is often used to ascertain the perceived quality of digital television and motion picture films.

According to the present invention, a novel application is used for a metric as a loss function of a system of a deep neural network 20 or deep neural network (DNN) system for direct image illumination transformation and imaging.

Determining the prevailing illumination conditions is an important issue for camera-based systems. The general robustness of various computer vision algorithms or methods and algorithms of machine vision depends strongly on the external illumination conditions. With various core applications or main applications, a failure to recognize and respond to a sudden change in illumination (upon entering a tunnel, for example), or during or upon a longer-term change in the natural lighting (sunset, for example) may result in a drastic deterioration in the quality of the camera input, and likewise, an impairment of the output quality of the computer vision function or the function of the machine vision, which is based on such an input.

Conventional image enhancement methods or algorithms are able to improve the image quality only in specific scenarios.

It is an aim of the present invention to supply computer vision methods or machine vision methods with high-quality images in any given scenario. Machine learning methods may deal with this complexity, but problems still remain.

It is difficult to guarantee an unaltered image structure, i.e., to avoid artifacts in the output image that are created by the process of machine learning. For safety-critical or safety-relevant automotive applications, such a property would be very advantageous, even if not necessary. The procedure provided according to the present invention avoids this problem.

When deep neural networks which are part of machine learning methods are used, so-called loss functions may be defined which are minimized during a training phase; i.e., their value should thus be minimal. For the deep neural network, the loss function defines a metric during the training. A lower value of the loss function corresponds to better performance of the neural network and of the method carried out using it.

When a learning problem is considered that is monitored with an orientation toward image modification, the value of the corresponding loss function is typically or normally computed between a modified image (output) and a desired image (target).

The most frequently used loss function is based on the so-called $L^2$ loss or L-squared loss, which is defined by the equation $$L = \sum_{i=1}^{n} (y_i - f(x_i))^2,$$

where $y_i$ is the target value and $f(x_i)$ denotes the instantaneous output.

The problem with this approach is that it requires the same object structure in both the input image and the target image, since otherwise, the loss function also detects the structural differences.

Since only changes in the illumination conditions are to be eliminated, input images and target images from different positions must be used. However, the image structure (the geometric content, for example) is not the same for an arbitrary input and the selected target image.

According to the present invention, a modified version of structural similarity index SSIM' or the SSIM index is used, namely, as a metric in order to find a solution to this problem.

Original structural similarity index SSIM or the SSIM index is a widely used method for predicting or generally describing the quality of primarily digital videos and images.

The original rule for computing structural similarity index SSIM, also referred to here and below as the SSIM index, applies a comparison between a first image or partial image (window) x and a second image or partial image (window) y, each having the same size/pixel number. The computation is given in equation (1). The computation rule is transformable into a product representation by factorization into three portions l, c, and s. This product representation is found with the definitions of equations (2) through (4) in the representation of equation (5).

$$SSIM(x, y) = \frac{(2\mu_x\mu_y + C_1)(2\sigma_{xy} + C_2)}{(\mu_x^2 + \mu_y^2 + C_1)(\sigma_x^2 + \sigma_y^2 + C_2)} \quad (1)$$

$$l(x, y) = \frac{2\mu_x\mu_y + C_1}{\mu_x^2 + \mu_y^2 + C_1} \quad (2)$$

$$c(x, y) = \frac{2\sigma_x\sigma_y + C_2}{\sigma_x^2 + \sigma_y^2 + C_2} \quad (3)$$

$$s(x, y) = \frac{2\sigma_{xy} + C_3}{\sigma_x\sigma_y + C_3} \quad (4)$$

$$SSIM(x, y) = l(x, y) \cdot c(x, y) \cdot s(x, y) \quad (5)$$

Term l(x,y) describes the luminance between images or partial images x, y of equal size. Term c(x,y) describes the contrast between these images or partial images x, y. Term s(x,y) describes the structural portion or component between these images or partial images x, y.

In particular, these terms describe differences between images or partial images x, y with regard to the particular variables of luminance, contrast, and structure.

The values of expressions $\mu_x$, $\mu_y$, $\sigma_x^2$, $\sigma_y^2$, $\sigma_{xy}^2$ are computed, for example, at windows or details of the image (which are small in particular compared to the particular overall image), for example at partial images, when the window or the detail is shifted along the overall image.

For equations (1) through (5), the individual formula terms have the following meanings:
$\mu_x$: average value of x,
$\mu_y$: average value of y,
$\sigma_x^2$: variance of x,
$\sigma_y^2$: variance of y,
$\sigma_{xy}^2$: covariance of x and y,
$c_1$: variable for stabilizing the division for small denominators, for example $c_1=(k_1L)^2$,
$c_2$: variable for stabilizing the division for small denominators, for example $c_2=(k_2L)^2$,
$c_3$: variable for stabilizing the division for small denominators, for example $c_3=c_2/2$,
L: dynamic range of the pixel values, for example having the value $2_{number\ of\ bits\ per\ pixel}-1$,
$k_1$: a function of the application, for example having a value of 0.01, and
$k_2$: a function of the application, for example having a value of 0.03.

A core concept of the present invention is that during training S1 of underlying method S, for example based on a deep neural network 20 (DNN), the SSIM index is not evaluated for a direct comparison with regard to two images, but, rather, a relationship is created between three images via a modified index SSIM', namely, an input image i, an output image o of the underlying image-processing process, for example based on deep neural network 20 (DNN), and a target image t, also referred to as a setpoint image, generally recorded at a different point in time and under different exposure conditions of the depicted scene, or otherwise a similar scene, i.e., showing the same or essentially the same scene as input image i.

(i) Term l(x,y) for luminance and term c(x,y) for contrast are determined between output image o and target image t; i.e., in particular variables l(o,t) and c(o,t) are ascertained.

(ii) Structural term s(x,y) is determined between input image i and output image o; i.e., variable s(i,o) is ascertained.

(iii) The SSIM index as a whole is then evaluated based on the factorization according to equation (5), but applying a weighting having hyperparameters α, β, γ, which are predefined and/or to be determined as a function of the application, in an exponential representation according to equation (5'). Thus, for modified SSIM index SSIM', the following results:

$$SSIM'(i,o,t)=l(o,t)^\alpha \cdot c(o,t)^\beta \cdot s(o,t)^\gamma \quad (5')$$

In this way, underlying deep neural network 20 (DNN) that is used is forced to learn the illumination characteristic, using luminance and contrast based on target image t, and to obtain the structure from input image i.

Since modified SSIM index SSIM' also is or supplies a similarity metric having values between 0 and 1, it is necessary to subtract the ascertained value of the SSIM index or the metric from the value 1 in order to obtain a loss function, which is then denoted by $SSIM_{loss}$.

Therefore, the loss function defined according to the present invention has a form according to the following equation (6):

$$SSIM_{loss}(i,o,t)=1-SSIM'(i,o,t)=1-l(o,t)^\alpha \cdot c(o,t)^\beta \cdot s(o,t)^\gamma \quad (6)$$

Symbol i once again denotes the input image, o the output image, and t the target image. Parameters α, β, γ, as previously mentioned, are so-called hyperparameters which define the relative weight of the individual portions and are predetermined, for example also as a function of the particular application, it also being possible in particular to apply an optimization of the underlying image processing process for generating output image o for a given input image i and a given target image t, and in particular to apply the training of the underlying deep neural network.

In machine learning methods, hyperparameters are generally understood to mean coefficients whose value is not easily determined or established, and for which it is necessary in practice to adapt or even optimize these variables during the optimization process for the system. This may take place by setting a particular hyperparameter at a fixed value prior to the system training, and by testing and adapting multiple of these fixed configurations.

As a further modification, the core of the parameter expressions $\mu_x$, $\mu_y$, $\sigma_x^2$, $\sigma_y^2$, $\sigma_{xy}^2$, i.e., their computation expressions, may be changed. It has been found that use of the Gaussian core is superior to the originally employed main core, which is most frequently used.

What is claimed is:

1. A system for assessing and/or adapting an image recorded with a camera, comprising:
a deep neural network, wherein the deep neural network undergoes a training;
wherein the training of the deep neural network is carried out based on a loss function as a metric,
wherein the loss function is based on a structural similarity index (SSIM'),
wherein the structural similarity index (SSIM') in the training is ascertained based on at least one input image of the underlying camera, an output image of the deep neural network, and in particular an adaptation process via the deep neural network and a target image as a default, and
wherein the structural similarity index (SSIM') is used in conjunction with a loss function ($SSIM_{loss}$), in particular according to the following equation (I):

$$SSIM_{loss}(i,o,t)=1-SSIM'(i,o,t), \quad (I)$$

as a function of an input image (i), an output image (o), and a target image (t), and/or as a metric of the training of the underlying deep neural network.

2. The system of claim 1, wherein:
in the training, a particular input image and a particular target image depict the same scene or essentially the same scene with different exposure conditions, in particular with regard to luminance and/or contrast,
the scene depicted in the input image is at most represented more poorly or is at most illuminated with a lower illumination intensity and/or with less contrast than the scene in the target image,
the target image is provided by the same camera as the input image, and/or
the target image is provided at a different point in time than the input image.

3. The system of claim 1, wherein in the training, a plurality of input images is based on one or multiple target images or multiple scenes.

4. The system of claim 1, wherein during the training of the underlying deep neural network, an operation of optimizing is based on the index (SSIM') and/or on the loss function ($SSIM_{loss}$).

5. The system of claim 1, wherein the system for assessing and/or adapting the image is recorded with the camera, in an operating assistance system of a working device or a vehicle.

6. A system for assessing and/or adapting an image recorded with a camera, comprising:
a deep neural network, wherein the deep neural network undergoes a training;
wherein the training of the deep neural network is carried out based on a loss function as a metric,
wherein the loss function is based on a structural similarity index (SSIM'), and
wherein the structural similarity index (SSIM') in the training is ascertained based on at least one input image of the underlying camera, an output image of the deep neural network, and in particular an adaptation process via the deep neural network and a target image as a default,
wherein the index structural similarity (SSIM') is used in a product representation, in particular according to the following equation (II):

$$SSIM'(i,o,t)=l(o,t)^{\alpha} \cdot c(o,t)^{\beta} \cdot s(o,t)^{\gamma}, \quad (II)$$

and/or the structural similarity index is used in conjunction with a first component or factor l that describes the luminance and/or illumination intensity between an output image (o) and a target image (t), a second component or factor c that describes the contrast between the output image (o) and the target image (t), and a third component or factor s that describes the structural component between an input image (i) and the output image (o), each of the components or factors being weighted in particular with the aid of a hyperparameter $\alpha$, $\beta$, $\gamma$ that functions as an exponent of the particular factor.

7. The system of claim 6, wherein:
a term of the form according to equation (2)

$$l(x,y) = \frac{2\mu_x\mu_y + C_1}{\mu_x^2 + \mu_y^2 + C_1} \quad (2)$$

is used as the first component or factor l,
a term of the form according to equation (3)

$$c(x,y) = \frac{2\sigma_x\sigma_y + C_2}{\sigma_x^2 + \sigma_y^2 + C_2} \quad (3)$$

is used as the second component or factor c, and/or
a term of the form according to equation (4)

$$s(x,y) = \frac{2\sigma_{xy} + C_3}{\sigma_x\sigma_y + C_3} \quad (4)$$

is used as the third factor s, and/or
x is a first image or partial image,
y is a second image or partial image,
$\mu_x$ is an average value of the first image or partial image x,
$\mu_y$ is an average value of the second image or partial image y,
$\sigma_x^2$ is the variance of the first image or partial image x,
$\sigma_y^2$ is the variance of the second image or partial image y,
$\sigma_{xy}^2$ is the covariance of the first and the second images or partial images x and y,
$c_1$ is a first variable that is predetermined or is to be predetermined for stabilizing the division for small denominators, in particular where $c_1=(k_1 L)^2$,
$c_2$ is a second variable that is predetermined or is to be predetermined for stabilizing the division for small denominators, in particular where $c_2=(k_2 L)^2$,
$c_3$ is a third variable that is predetermined or is to be predetermined for stabilizing the division for small denominators, in particular where $c_3=c_2/2$,
L is a dynamic range of the pixel values, in particular having a value $2^{number\ of\ bits\ per\ pixel} -1$,
$k_1$ is a first parameter that is predetermined or is to be predetermined as a function of the application, having a value of about 0.01, and/or
$k_2$ is a second parameter that is predetermined or is to be predetermined as a function of the application, having a value of about 0.03.

8. The system of claim 7, wherein during the training, the first component or factor l and the second component or factor c between an output image (o) and a setpoint or target image (t) of the deep neural network are determined as the first image and the second image (x, y), and/or the third component or factor between an associated input image (i)

and the output image (o) of the deep neural network is determined as the first image and the second image (x, y).

9. An operating assistance method for a working device and/or a vehicle, the method comprising:
assessing and/or adapting an image recorded with a camera, by performing the following:
training a deep neural network, wherein the training of the deep neural network is carried out based on a loss function as a metric, wherein the loss function is based on a structural similarity index (SSIM'); and
ascertaining the structural similarity index (SSIM') in the training based on at least one input image of the underlying camera, an output image of the deep neural network, and in particular an adaptation process via the deep neural network and a target image as a default;
wherein the structural similarity index (SSIM') is used in conjunction with a loss function (SSIM$_{loss}$), in particular according to the following equation (I):

$$\text{SSIM}_{loss}(i,o,t)=1-\text{SSIM}'(i,o,t), \qquad (I)$$

as a function of an input image (i), an output image (o), and a target image (t), and/or as a metric of the training of the underlying deep neural network.

10. A control unit for a working device and/or a vehicle, comprising:
a system for assessing and/or adapting an image recorded with a camera, including:
a deep neural network, wherein the deep neural network undergoes a training;
wherein the training of the deep neural network is carried out based on a loss function as a metric,
wherein the loss function is based on a structural similarity index (SSIM'),
wherein the structural similarity index (SSIM') in the training is ascertained based on at least one input image of the underlying camera, an output image of the deep neural network, and in particular an adaptation process via the deep neural network and a target image as a default, and
wherein the structural similarity index (SSIM') is used in conjunction with a loss function (SSIM$_{loss}$), in particular according to the following equation (I):

$$\text{SSIM}_{loss}(i,o,t)=1-\text{SSIM}'(i,o,t), \qquad (I)$$

as a function of an input image (i), an output image (o), and a target image (t), and/or as a metric of the training of the underlying deep neural network.

11. A working device and/or a vehicle, comprising:
a system for assessing and/or adapting an image recorded with a camera, including:
a deep neural network, wherein the deep neural network undergoes a training;
wherein the training of the deep neural network is carried out based on a loss function as a metric,
wherein the loss function is based on a structural similarity index (SSIM'),
wherein the structural similarity index (SSIM') in the training is ascertained based on at least one input image of the underlying camera, an output image of the deep neural network, and in particular an adaptation process via the deep neural network and a target image as a default, and
wherein the structural similarity index (SSIM') is used in conjunction with a loss function (SSIM$_{loss}$), in particular according to the following equation (I):

$$\text{SSIM}_{loss}(i,o,t)=1-\text{SSIM}'(i,o,t), \qquad (I)$$

as a function of an input image (i), an output image (o), and a target image (t), and/or as a metric of the training of the underlying deep neural network.

* * * * *